United States Patent [19]
Barclay et al.

[11] Patent Number: 6,082,133
[45] Date of Patent: Jul. 4, 2000

[54] APPARATUS AND METHOD FOR PURIFYING NATURAL GAS VIA CRYOGENIC SEPARATION

[75] Inventors: Michael A. Barclay, Redmond, Wash.; Thomas C. Brook, Victoria, Canada; John A. Barclay, Redmond, Wash.; Raymond R. Tison, Mentor, Ohio

[73] Assignee: Cryo Fuel Systems, Inc, Redmond, Wash.

[21] Appl. No.: 09/245,570

[22] Filed: Feb. 5, 1999

[51] Int. Cl.[7] .................................................. F25J 1/00
[52] U.S. Cl. .................................. 62/619; 62/637; 62/909
[58] Field of Search ........................... 62/619, 637, 908, 62/909

[56] References Cited

U.S. PATENT DOCUMENTS

| | | | |
|---|---|---|---|
| 3,093,470 | 6/1963 | Melikian et al. | 62/637 |
| 4,283,212 | 8/1981 | Graham et al. | 62/908 |
| 5,737,941 | 4/1998 | Hsiung et al. | 62/908 |
| 5,740,682 | 4/1998 | Lavie | 62/908 |

*Primary Examiner*—Ronald Capossela
*Attorney, Agent, or Firm*—Calvin B. Ward

[57] ABSTRACT

An apparatus for separating $CO_2$ from a mixture of gases includes $CO_2$ and a second gas, the apparatus includes an active heat exchanger and a regenerating heat exchanger. The active heat exchanger includes a heat exchange surface in contact with the mixture of gases. The mixture of gases is present in the active heat exchanger at a predetermined pressure which is chosen such that $CO_2$ freezes on the heat exchange surface when the surface is cooled by a refrigerant having a temperature below that at which $CO_2$ freezes at the predetermined pressure. The regenerating heat exchanger includes a heat exchange surface in contact with the refrigerant and also in contact with a layer of frozen $CO_2$. The refrigerant enters the regenerating heat exchanger at a temperature above that at which the $CO_2$ in the frozen layer of $CO_2$ sublimates. The sublimation of the solid $CO_2$ cools the refrigerant prior to the refrigerant being expanded through an expansion valve, which reduces the temperature of the refrigerant to a point below the freezing point of $CO_2$ at the predetermined pressure. The refrigerant is re-compressed by a compressor after leaving the active heat exchanger. In the preferred embodiment of the present invention, the gaseous $CO_2$ released by the regenerating heat exchanger is used to precool the incoming gas mixture. A second precooling heat exchanger precools the compressed refrigerant by providing thermal contact with the refrigerant leaving the active heat exchanger.

5 Claims, 3 Drawing Sheets

APPARATUS AND METHOD FOR PURIFYING NATURAL GAS VIA CRYOGENIC SEPARATION

FIELD OF THE INVENTION

The present invention relates to the process of purification of methane gas sources, and more particularly, to the cryogenic purification of methane gas sources having a high carbon dioxide concentration.

BACKGROUND OF THE INVENTION

Low grade methane gas sources such as that arising from the decay of organic materials have been recognized as potential energy sources for at least 50 years. Such gas sources include gas from landfill sites and anaerobic digesters that produce "biogas" comprised primarily of methane and carbon dioxide. Numerous other trace impurities as well as oxygen and nitrogen may also be present in the biogas in varying amounts. Biogas escaping from landfill sites possesses both environmental and safety hazards. Further, both methane and carbon dioxide components in the biogas are potentially valuable products if properly purified. Hence, it would be advantageous to capture the energy value of the biogas while eliminating the environmental and safety hazards. In spite of the desirability of utilizing biogas from landfills and digesters, such methane gas sources have been underutilized because of problems effectively purifying the gas, namely, removing the trace amounts of noxious substances, and then effectively separating the carbon dioxide component from the methane component. About one third to one half of the biogas stream generated by anaerobic decay of organic material is carbon dioxide. Hence, the volumetric energy content of the unpurified biogas stream is substantially less than that of pipeline natural gas. Accordingly, unpurified biogas cannot be introduced into gas pipelines or easily utilized in conventional equipment without processing the gas mixture to remove the carbon dioxide and other impurities.

Numerous systems for purifying biogas sources have been suggested. Separation systems based on membranes, pressure swing adsorption, temperature swing adsorption, chemical absorption, and cryogenic processes have all been reported. Each of these systems has the potential of successfully purifying biogas at sites where large volumes of biogas are available for processing or where final methane purities below 95% are acceptable. However, none of these is economically viable for biogas sources smaller than one to two million standard cubic feet per day. For biogas sources producing less than this volume per day or where high purities are required, the capital investment, the operating costs, and or system complexity limit practical or economic use of existing systems.

The harsh, corrosive, continuous operating environments present at landfill sites limit the effectiveness of systems requiring maintenance, supervision, or chemical additives. Complex systems generally have higher capital and maintenance costs.

In principle, biogas can be cryogenically separated into its components using distillation techniques. Unfortunately, distillation techniques are more difficult for biogas mixtures of carbon dioxide and methane because of several unique features of the phases present in equilibrium mixtures. Cryogenic separations may be broadly divided into continuous and non-continuous (batch) approaches. Continuous cryogenic systems utilize a region or zone where carbon dioxide and methane are continuously separated from one another through the phase differences between components. For example, to obtain a purity of >98% methane at a constant pressure below 700 psia, the solid $CO_2$ that readily forms must be separated from the mixture feed stream. Operation below the critical point of the mixture is required to maintain distinct phases and allow phase separation. The range of temperature and pressure values available for such conventional cryogenic distillation is quite limited.

Numerous cryogenic processes for separating carbon dioxide and methane are taught in the prior art. For example, A. S. Holmes, et al. (U.S. Pat. No. 4,462,814) teach a process and apparatus for avoiding a solid carbon dioxide phase in a distillation process. Commonly termed the Ryan-Holmes process, alkane additives such as propane or butane are used to avoid solid $CO_2$ formation during liquid distillation-based separation. The butane or propane is separated from the $CO_2$ after co-distillation from the $CH_4$ and is recirculated into the distillation tower. Heavy hydrocarbons (C3+) are added to the feedstream to allow operation with decreased pressures and elevated temperatures without solid $CO_2$ formation. The addition of n-butane to the feedstream allows the distillation of the mixture to occur well within the liquid-vapor phase, eliminating solid $CO_2$ formation in the distillation column. In addition, the critical pressure of the mixture is raised to create a greater range of acceptable operating pressures.

The Ryan-Holmes Process, however, has two significant limitations for biogas purification. First, the system complexity leads to high capital costs and the inability to scale to smaller feedstreams. As pointed out above, such costs are problematic in landfill recovery systems. Second, this process requires a supply of propane or heavier alkanes that are generally not present at landfill sites.

More recently Potts, Jr., et al., (U.S. Pat. No. 5,120,338) teach a method for separating a multi-component feedstream using distillation and a controlled freeze zone. This approach differs from the Ryan-Holmes process in that solid carbon dioxide is allowed to form in a controlled manner. This solid is melted and incorporated into the liquid portion of a liquid phase. A third gas phase is enriched in the most volatile component, methane, allowing its separation. By carefully controlling the conditions of solid formation, and gas-liquid distillation, the components may be separated into three streams. Essentially, this system allowed the desired product purity to be reached without avoiding the formation of solid carbon dioxide or the use of additives. The primary limitations of this process pertain to its scalability. The complexity and capital costs of the system require a biogas source larger than two million cubic feet per day to be economically viable. This approach is too complex and has too high of capital costs to be viable at smaller gas sources.

Several techniques are also taught that employ some cooling in conjunction with a second type of separation mechanism. For instance, Sweeney, et al. (U.S. Pat. No. 5,570,582), Soffer, et al. (U.S. Pat. No. 5,649,996), and Ojo, et al. (U.S. Pat. No. 5,531,808) teach processes by which the operation of adsorption systems is augmented by operation at sub-ambient or cryogenic temperatures. Lokhandwala (U.S. Pat. No. 5,647,227) teaches a process and apparatus by which a mixture of methane, nitrogen, and at least one other component (carbon dioxide) are separated. This processes employs a cryogenic separation augmented by a membrane. Such systems do not rely on solid phase formation or distillation to affect the separation. These hybrid systems also have costs and complexities which limit their use to landfill sites having biogas streams greater than approximately two million cubic feet per day.

In U.S. Pat. No. 5,642,630, Abdelmalek, et al. disclose a solid waste landfill gas treatment and separation process that claims production of a high quality liquefied natural gas stream, liquefied carbon dioxide stream, and a compressed natural gas stream. The patent teaches the use of a four-stage compressor to generate pressures up to 1800 psia, as well as three flash drums, the use of chemical additives, and multiple recirculation loops to obtain the desired products. The complexity of this system and related capital costs limit its usefulness at small landfill sites.

In U.S. Pat. No. 4,681,612 O'Brien, et al. disclose a cryogenic separation system that produces a fuel-grade methane product stream and the option of a carbon dioxide product stream. This approach relies on a cryogenic distillation column in which the methane is the more volatile, and thus the overhead product is enriched in methane. The methane is further separated from the overhead product with the use of a selective membrane. The bottom product primarily contains the carbon dioxide with impurities that may be further purified in a separate purification column and used as a product stream if desired. This approach suffers from two problems. First, because the system is a hybrid, using both a distillation column and a membrane, complexity and capital costs are increased. Second, high purity carbon dioxide and methane are not readily produced without subsequent processing and additional capital expenditures. Without the ability to produce high purity products, the applicability of this approach is limited.

Several techniques using chemical additives to separate carbon dioxide and methane in landfill gas and other gas streams have also been reported. Methanol is often used as a chemical additive (Apffel, U.S. Pat. No. 4,675,035). The addition of methanol to the gas mixture during the distillation decreases the temperature and pressure range at which solid carbon dioxide will form. This allows the distillation of the methane to proceed more completely, thereby providing higher purity products. Methanol can be separated from the carbon dioxide and recycled once the distillation process is complete. "Cold Methanol" separations as they are commonly called have offered one of the best methods to separate biogas to date. These systems, however, do not scale well to smaller biogas sources because of the system complexity, capital costs, and operating costs associated with the combined absorption and distillation processing equipment.

A second system employing chemical additives is taught by Abdelmalek (U.S. Pat. No. 5,642,630). This approach is one that uses chemical absorption to aid in the separation. As previously mentioned, systems requiring chemical additives and absorption increase operating costs due to the costs of the additive as well as capital costs and complexity to separate and recirculate the additives. Such systems are not economically feasible for biogas sources producing less than approximately two million standard cubic feet per day.

Broadly, it is the object of the present invention to provide an improved separation system process and apparatus for separating a gas stream containing, at a minimum, both carbon dioxide and methane, into high purity methane and high purity carbon dioxide product streams.

It is a yet further object of the present invention to provide a separation system that uses the formation of solid carbon dioxide to affect a highly effective separation.

It is a further object of the present invention to provide a separation system that has lower capital cost than prior art systems.

It is a still further object of the present invention to provide a separation system that is less complex than prior art systems. It is a yet further object of the present invention to provide a separation system that has lower operating costs than prior art systems.

These and other objects of the present invention will become apparent to those skilled in the art from the following detailed description of the invention and the accompanying drawings.

SUMMARY OF THE INVENTION

The present invention is an apparatus for separating $CO_2$ from a mixture of gases that includes $CO_2$ and a second gas, the apparatus includes an active heat exchanger and a regenerating heat exchanger. The active heat exchanger includes a heat exchange surface in contact with the mixture of gases. The mixture of gases is present in the active heat exchanger at a predetermined pressure which is chosen such that $CO_2$ freezes on the heat exchange surface when the surface is cooled by a refrigerant having a temperature below that at which $CO_2$ freezes at the predetermined pressure. The regenerating heat exchanger includes a heat exchange surface in contact with the refrigerant and also in contact with a layer of frozen $CO_2$. The refrigerant enters the regenerating heat exchanger at a temperature above that at which the $CO_2$ in the frozen layer of $CO_2$ sublimates. The sublimation of the solid $CO_2$ cools the refrigerant prior to the refrigerant being expanded through an expansion valve, which reduces the temperature of the refrigerant to a point below the freezing point of $CO_2$ at the predetermined pressure. The refrigerant is re-compressed by a compressor after leaving the active heat exchanger. In the preferred embodiment of the present invention, the gaseous $CO_2$ released by the regenerating heat exchanger is used to precool the incoming gas mixture. A second precooling heat exchanger precools the compressed refrigerant by providing thermal contact with the refrigerant leaving the active heat exchanger. In the preferred embodiment of the present invention, first and second heat exchangers are utilized to provide the active and regenerating heat exchanger. The choice of which heat exchanger is the active heat exchanger at any time is made by a valve system which routes the gas mixture and refrigerant streams to and from the active heat exchanger and regenerating heat exchangers.

DETAILED DESCRIPTION OF THE INVENTION

The present invention provides improvements over the art by utilizing a single stage process to separate the $CO_2$ and $CH_4$ into high purity product streams without the need for further polishing to enhance the purity of the products. Furthermore, the methane product stream can be liquefied to form a high value product in the same stage in which the separation of carbon dioxide and methane takes place. The incorporation of this processing into a single cryogenic step results in a system that offers lower capital costs, lower operating costs, and reduced complexity. This novel, less expensive approach will allow the exploitation of a large number of smaller landfills that have been uneconomical with prior art, and will offer superior gas processing capabilities at larger landfills that could be or are being currently exploited with existing technology.

Figure 1:
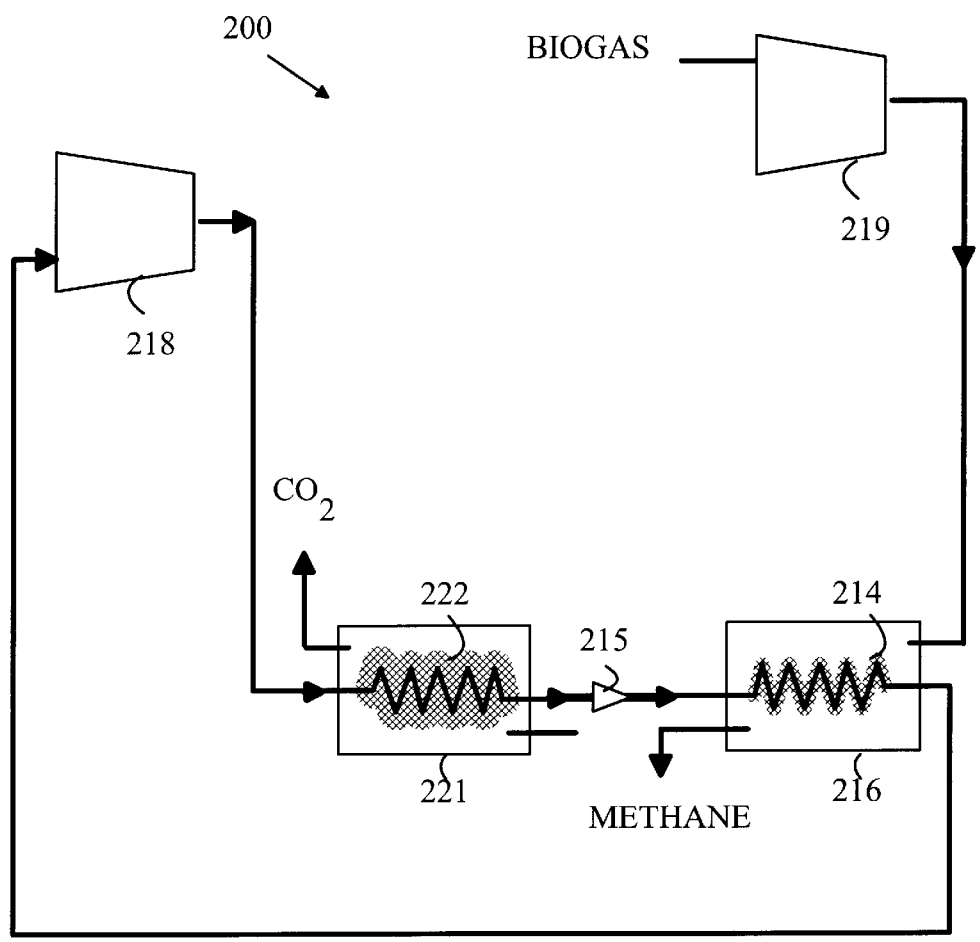
FIG. 1 is a schematic drawing of a portion of a biogas purification system according to the present invention.

The manner in which the present invention obtains its advantages may be more easily understood with reference to FIG. 1, which is a schematic drawing of a simplified version of a $CO_2$ purification system 200 according to the present invention for separating $CO_2$ from methane in a biogas feedstream. To simplify the following discussion, only the system configuration relative to one half of the cycle is shown.

Biogas purification systems according to the present invention utilize two heat exchangers, shown at 216 and 221, and a compressor for compressing a refrigerant used to cool the biogas to the point at which the $CO_2$ separates out as a solid. The heat exchanger in which the $CO_2$ is separated from the methane will be referred to as the "active heat exchanger" in the following discussion. The other heat exchanger will be referred to as the "regenerating heat exchanger" for reasons that will become clear from the following discussion. In the configuration shown in FIG. 1, heat exchanger 221 is the regenerating heat exchanger and heat exchanger 216 is the active heat exchanger.

In the simplified version of the system shown in FIG. 1, the biogas is cooled in heat exchanger 216 by a refrigerant that is expanded through expansion valve 215. The $CO_2$ is precipitated out of the biogas and forms a coating on the heat exchange surface as shown at 214.

The refrigerant leaving heat exchanger 216 is compressed by compressor 218 and pre-cooled in heat exchanger 221 prior to expansion through valve 215. Heat exchanger 221 was previously the active heat exchanger and is now the regenerating heat exchanger. Heat exchanger 221 has a coating of solid $CO_2$ on the heat exchange surface as shown at 222. The sublimation of this coating provides the source of cooling for the refrigerant passing through heat exchanger 221. Hence, the work performed in solidifying the $CO_2$ when the $CO_2$ was precipitated from the biogas during the period in which heat exchanger 221 was the active heat exchanger is re-captured as useful work during the period in which heat exchanger 221 is regenerating.

If the biogas contains significant quantities of water, gases other than methane and $CO_2$, or other organic compounds that are unacceptable in the final methane stream, the incoming biogas may be processed through a carbon and/or zeolite separator or other device to remove these components. Such separation systems are known in the art, and hence, will not be discussed in detail here.

As noted above, the system shown in FIG. 1 only illustrates one half of the separation cycle. During the second half of the cycle, the roles of heat exchangers 216 and 221 are reversed. That is, heat exchanger 221 becomes the regenerating heat exchanger and heat exchanger 216 becomes the active heat exchanger. The roles must be reversed as soon as the solid $CO_2$ in the regenerating heat exchanger is exhausted. However, the heat exchangers can be exchanged as soon as the regenerating heat exchanger has recovered its heat transfer efficiency Refer now to FIG. 2, which is a schematic drawing of one embodiment of a $CO_2$ purification system 2 according to the present invention for separating a mixed feedstream into pure $CO_2$ and $CH_4$ product streams. The feedstream 5 containing, at a minimum, $CO_2$ and $CH_4$, enters the separation system coldbox 7, which includes a precooling/recuperative heat exchanger 10. The feedstream is assumed to be free of any significant organic or inorganic trace impurities. The feedstream enters at a pressure of approximately 200 psig. Pretreatment systems for removing the impurities normally found in landfill gas are known to those skilled in the art, and hence, will not be discussed in detail here. The reader is directed to "Landfill Gas: Resource Evaluation and Development", GRI Report 85/0259, Chicago, Ill. August 1985 for a more complete discussion. The feedstream typically contains approximately 45–60% methane, 35–50% carbon dioxide, and 1–5% nitrogen and oxygen as it enters the present invention. Coldbox 7 is used to thermally isolate the separation apparatus from ambient temperatures. Precooling recuperative heat exchanger 10 acts to cool the inlet stream 5 such that the maximum thermal energy is recovered from the sublimating $CO_2$ as discussed below. The temperatures in heat exchanger 10 are maintained such that no solid $CO_2$ forms in heat exchanger 10.

After exiting heat exchanger 10, the cooled feed stream enters a switching valve 15, which directs the feedstream to the currently active heat exchanger surface. In the current example, switching valve 15 directs the precooled feedstream into the left heat exchange surface module 20 that contains the externally-cooled heat exchange surface 25, which is currently acting to solidify the $CO_2$ out of the process stream.

A temperature gradient is established in module 20 by the cold refrigerant fluid passing therethrough, the feedstream inlet end of the module being warmer than the outlet end. For example, the cold end of the module may be near 150° K. and the warmer end near 195° K. The feedstream continues to cool and become enriched in $CH_4$ as solid $CO_2$ is deposited on heat exchange surface 25. In the embodiment shown in FIG. 2, the temperature at the outlet end of module 20 is cold enough to liquefy the pure methane component of the feedstream at ~200 psig. The LNG product stream 30 exits module 20 and flows to valve 35, which directs the LNG out of the coldbox via pipe 40.

Figure 2:
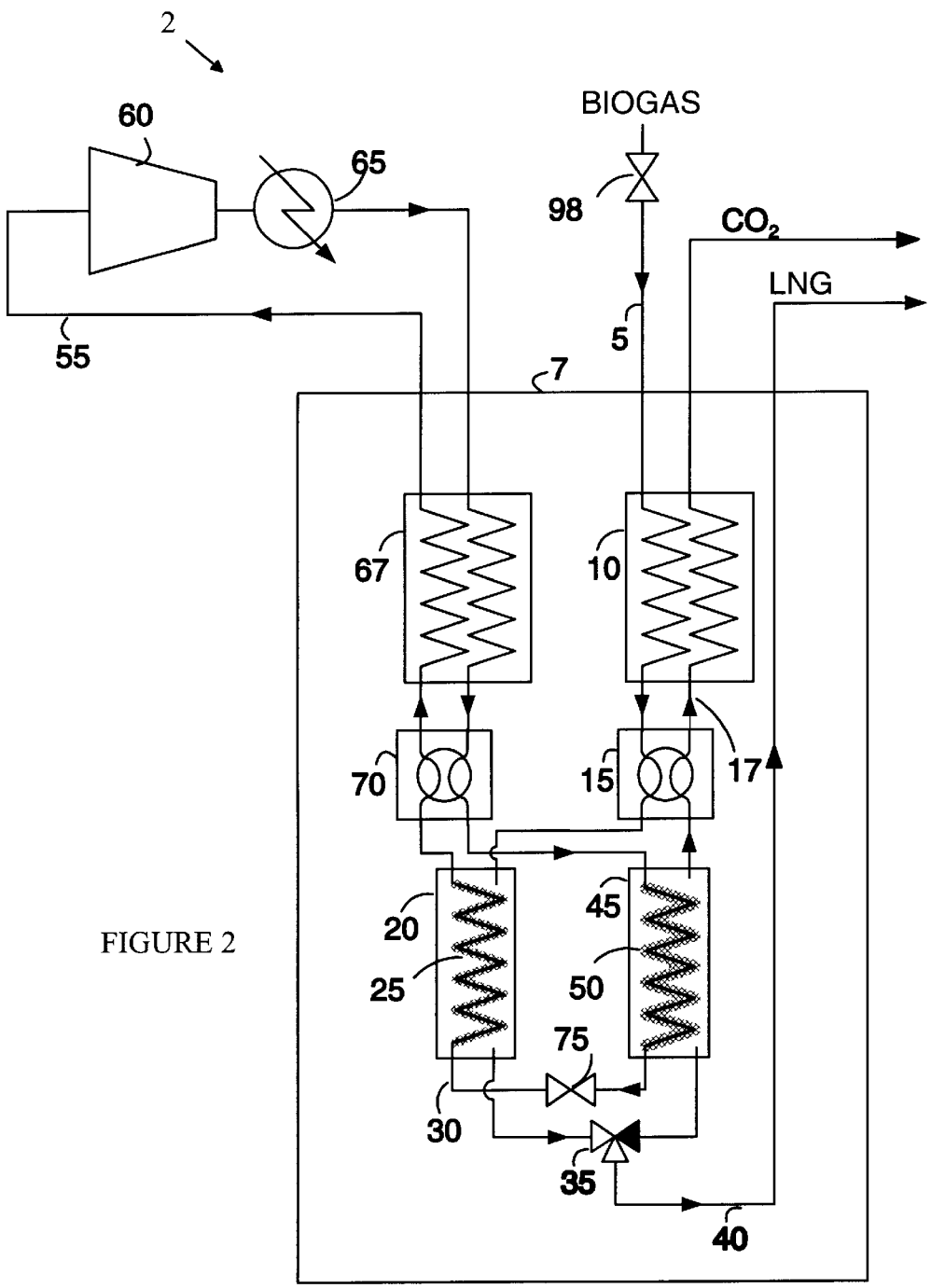
FIG. 2 is a schematic drawing of the preferred embodiment of a biogas purification system according to the present invention producing LNG.

If the final product is compressed natural gas (CNG), the LNG can be compressed in a cryogenic pump and vaporized recuperatively with the incoming process stream to form high purity compressed natural gas (CNG). The vaporization of the LNG can be used to precool the incoming feedstream or the refrigerant thereby substantially recovering the energy used to liquefy the natural gas. In heat exchanger 10, feedstream 5 was precooled by stream 12, which is a high purity $CO_2$ gaseous stream at or near 15 psig. This stream is produced in a second heat exchange module 45 that is identical to, and alternatively cycled with, module 20. As shown in FIG. 2, module 45 has previously been used as the active heat exchanger and a layer 51 of $CO_2$ has accumulated on its heat exchange surface 50. The pressure on the solid $CO_2$ side of module 45 is decreased to approximately atmospheric pressure. At this pressure $CO_2$ sublimes at a temperature of approximately 195° K. Accordingly, module 45 can be used to cool the refrigerant stream to approximately this temperature. The refrigerant fluid in the refrigerator loop provides the source of thermal energy to warm the heat exchange surface in the regenerating module and cause the sublimation to rapidly proceed. The temperature gradient of the heat exchanger surface in module 45 varies from 195° K. at the colder end and near 220° K. at the warmer end. The sublimation energy is recovered by transferring the energy to the refrigerant fluid that passes through module 45 prior to its entry into expansion valve 75. Valve 35 is closed at the lower end of module 45 which forces the gaseous $CO_2$ generated by the sublimation to leave module 45 and travel through switching valve 15. The pure, cold $CO_2$ gas acts to precool inlet feed stream 5 in heat exchanger 10 thereby recovering the sensible heat in the $CO_2$ gas. This additional recovery system substantially increases the efficiency of the system. The purified $CO_2$ stream exits heat exchanger 10 and cold box 7 at slightly sub-ambient temperatures and atmospheric pressure.

Cooling for the cryogenic separation unit is provided by a refrigerant loop. In this embodiment, refrigerant 55 enters compressor 60 with an inlet pressure of about 50 psig and leaves at an outlet pressure of 300 psig. The refrigerant exits compressor 60 above ambient temperature and is cooled by after-cooler 65 to a temperature approximately equal to ambient temperature. The refrigerant then enters coldbox 7 and recuperative heat exchanger 67. Heat exchanger 67 cools the refrigerant prior to it entering switching valve 70. In the preferred embodiment, heat exchanger 67 is a brazed plate-fin heat exchanger or a coiled fin-tube heat exchanger. Switching valve 70 directs the refrigerant to the appropriate module for precooling prior to expansion through valve 75 which cools the refrigerant to the operating temperature of the active heat exchange surface. In the configuration shown in FIG. 2, the high pressure refrigerant is directed to module 45 where it is further pre-cooled by the heat of sublimation of the solid $CO_2$ as it travels through the non-biogas containing side of heat transfer surface 50. Because the equilibrium sublimation temperature of $CO_2$ at a given pressure is known and constant, highly predictable and consistent pre-cooling is possible regardless of the amount of solid $CO_2$ present per stage in the regeneration so long as some solid remains. After pre-cooling in the regenerating module, the refrigerant is isenthalpically expanded from about 300 psig to a pressure of about 50 psig through expansion valve 75 to further cool the refrigerant to a temperature slightly below the desired cold temperature of the cold end of the actively freezing module 20. The cold refrigerant at near 150° K. then enters the non-biogas containing side of heat exchange surface 25 in module 20 and is warmed as it cools surface 25 and effects the freezing of the $CO_2$. The warmer refrigerant then enters heat exchanger 67 and is further warmed as it pre-cools the higher-pressure refrigerant stream. The refrigerant is heated to slightly sub-ambient temperatures prior to exiting the coldbox 7 and entering compressor 60 to complete the refrigerant cycle.

While the preferred embodiment utilizes an expansion valve to cool the refrigerant prior to entering the heat exchanger in which the $CO_2$ is solidified, other gas expander devices or other refrigeration processes can also be utilized without departing from the teachings of the present invention. For example, a turbine expander could be used instead of a valve to expand and cool the refrigerant.

It should be recognized that the controls, make-up gas composition, phase separators, refrigerant filters, drive motors, and other common components of the gas-cycle refrigerator have been omitted from FIG. 2 to simplify the drawing. These components and elements of the refrigerator are conventional in the art.

It should also be noted that the specific cooling system employed for the present invention is not critical to the successful operation of the separation system. While a low pressure mixed refrigerant system is used in the preferred embodiment, other recuperative refrigerators will also work. For instance, the recuperative refrigeration system can be based on isentropic turbo-expander cycles such as the Claude or Brayton cycles using nitrogen, argon, or pure methane gas as their refrigerants. Other expansion cycles such as Linde, high-pressure mixed refrigerant, or cascade cycles may also be utilized. The preferred refrigeration system utilizes a compressor having an output of about 300 psig and an expansion valve arrangement that expands the refrigerant from this pressure to about 50 psig. Such compressors are available from Carrier or Copeland Corporations. Such a refrigerator is preferred because it is reasonably efficient, inexpensive to build, and highly reliable. As noted above, both capital investment and reliability are important issues in any field operating commercial system. The refrigerant utilized in the preferred embodiment of the present invention is a mixture of butane, propane, ethane, methane, and argon at molar percentages of 23, 8, 23, 34, and 12, respectively. However, other refrigerant mixtures that avoid the use of butane and propane may be utilized.

When heat exchange surface 25 accumulates sufficient solid $CO_2$ to become limited either by insufficient heat transfer or increased pressure drop caused by solid $CO_2$ clogging the conduits of heat exchange surface 20, the other module 45 should be free of solid $CO_2$. At this point switching value 15 acts to switch the streams, and value 35 acts to allow stream 40 to flow from module 45. Similarly, switching valve 60 alters the refrigerant loop such that module 20 acts to precool the refrigerant flow. It should be noted that expansion valve 75 is shown as a reversing valve to simplify the drawing. In practice, such a valve is constructed from a valve system that redirects the flow through a single expansion valve. These valving changes effectively switch module 20 from the actively freezing module to the regenerating module where $CO_2$ will sublimate. The converse is true for module 45. The refrigerant flow is reversed such that the pre-expansion cooling unit becomes module 20 and the $CO_2$ freezing unit becomes module 45.

In the preferred embodiment of the present invention, the valves are sequenced to allow a brief period when the feedstream is not allowed to enter the active heat exchanger module until the desired temperature gradients are re-established in modules 20 and 45 by the flowing refrigerant stream. This brief interruption in the flow is approximately 5% of the total period of one cycle of operation that may be several minutes in duration. During this time, inlet valve 98 is closed to prevent the feedstream from entering the system.

The present invention can be configured to produce a pure methane gas stream at slightly sub-ambient temperatures instead of liquid methane. This variation of the present invention may be more easily understood with reference to FIG. 3 which is a schematic drawing of a simplified version of a gas processing system 20 according to the present invention for separating a biogas feedstream into pure $CO_2$ and $CH_4$ product streams. The feedstream 105 is essentially as described above with reference to FIG. 2.

Coldbox 107 is used to thermally isolate the separation apparatus from ambient temperatures. The precooling recuperative heat exchanger 110 cools the inlet stream 105 by recovering energy from the sublimating $CO_2$ stream 112, and purified methane stream 195 as discussed below. In the preferred embodiment, heat exchanger 110 is a three pass heat exchanger. Temperatures are maintained in the heat exchanger 110 such that no solid $CO_2$ forms in heat exchanger 110.

After exiting heat exchanger 110 the cooled feedstream enters a switching valve 115, which acts to direct the feedstream to the active heat exchanger for purification and selects the output of the currently regenerating heat exchanger as a cooling source. Switching valve 115 directs precooled stream 105 into heat exchange surface module 120 which contains heat exchange surface 125 on which the $CO_2$ is removed from the feedstream. Heat exchangers 120 and 145 operate essentially as described above with respect to heat exchangers 20 and 45 shown in FIG. 2.

In the current embodiment the methane component of the stream leaves the active heat exchanger as a liquid under a pressure of approximately 200 psig. The methane product stream 130 exits module 120 and flows to valve 135, which directs the methane stream to heat exchanger 137. The LNG is vaporized in heat exchanger 137 by transferring heat from the high pressure refrigerant. Stream 140 leaves heat exchanger 137 and enters recuperative/precooling heat exchanger 110 where it is utilized to precool the incoming biogas feedstream as it warms to near ambient temperatures prior to exiting the cold box as stream 195. Care must be taken to ensure that stream 140 is warmed sufficiently in heat exchanger 137 so that no solids will form in heat exchanger 110.

In heat exchanger 110, biogas feedstream 105 was precooled by stream 112, which is a high purity $CO_2$ gaseous stream at near 15 psig. This stream is produced in a second heat exchange surface module 145 in a manner analogous to that described above with reference to the embodiment of the present invention shown in FIG. 2.

Cooling for the cryogenic separation unit is provided with a gas-cycle refrigerant loop analogous to that described above with reference to FIG. 2. In this embodiment, the refrigerant 155 enters compressor 160 with an inlet pressure of about 50 psig and outlet pressure of 300 psig. The refrigerant exits compressor 160 above ambient temperature and is cooled by after-cooler 165 approximately to ambient. The refrigerant then enters coldbox 107 and recuperative heat exchanger 167. Heat exchanger 167 cools the refrigerant prior to it entering switching valve 170. Switching valve 170 directs the refrigerant to the regenerating module for pre-cooling. After pre-cooling in the regenerating module, the refrigerant is directed by switching valve 180 to pre-cooling heat exchanger 137 where it is further cooled by the cold methane stream 130. Following the third precooling stage in heat exchanger 137, the refrigerant is isenthalpically expanded from approximately 300 psig to a pressure of approximately 50 psig through expansion valve 175. This expansion cools the refrigerant to a temperature slightly below the desired cold temperature of the cold end of the actively freezing module 120. The refrigerant is then directed to the active heat exchanger switching valve 180. The cold refrigerant at near 150° K. then enters the non-biogas containing side of heat exchange surface 125 in module 120 and is warmed as it cools surface 125 by freezing the $CO_2$. The warmer refrigerant then enters heat exchanger 167 and is further warmed as it pre-cools the higher-pressure refrigerant stream. The refrigerant is heated to slightly sub-ambient temperatures prior to exiting the coldbox 107 and entering compressor 160 to complete the refrigerant cycle. Heat exchanger 137 is important to the operation of the gas separation system because it decreases the temperature spanned by the expansion valve and enables methane stream 140 to be warmed to a temperature than will not cause solid formation in heat exchanger 110.

The refrigeration system utilized in this embodiment of the present invention is essentially the same as that described above with reference to the embodiment shown in Figure 2. Accordingly, it will not be discussed further here.

The switching of the active and regenerating heat exchangers in this embodiment of the present invention is essentially the same as described above with reference to the embodiment shown in FIG. 2. When the active heat exchanger accumulates sufficient solid $CO_2$ to significantly degrade its performance, it is switched with the regenerated heat exchanger.

It is important to note that the cooling provided by the sublimation of the $CO_2$ occurs at pressures lower than that required to begin liquefying and freezing the $CO_2$ from the biogas stream at higher pressure. This allows the temperature spanned by the expansion of the refrigerant to be greatly decreased and the temperature cycling of the thermal mass in the modules 20/120 and 45/145 is greatly reduced. Thus, the operational pressure of the subliming module is critical to an efficient design. This temperature can be decreased or increased somewhat depending on the pressure maintained in the sublimating module. The outlet pressure of the LNG should be close to that of the pressure in the LNG storage tanks. Colder LNG is considered more valuable. Further, the residual $CO_2$ present in the LNG is a function of pressure and temperature. Care must be taken to ensure that $CO_2$ can not solidify downstream from the heat exchange module. Consistent temperature gradients, inlet end temperatures, and outlet end temperatures should be maintained in heat exchangers 10/110 and 67/167. Further, care should be taken to insure that the flow through these heat exchangers does not reverse during cycling. Likewise, the flow through expansion valve 75/175 should not change direction or fluctuate significantly during cycling. The exit gas temperature for the refrigerant leaving the regenerating heat exchange surface module should remain constant as long as solid $CO_2$ is present. Hence, an increase in this temperature is an indication that regenerating is complete and that cycling should be reversed. Accordingly, this temperature is monitored in the preferred embodiment of the present invention and used to initiate the exchange of the active and regenerating heat exchangers.

Figure 3:
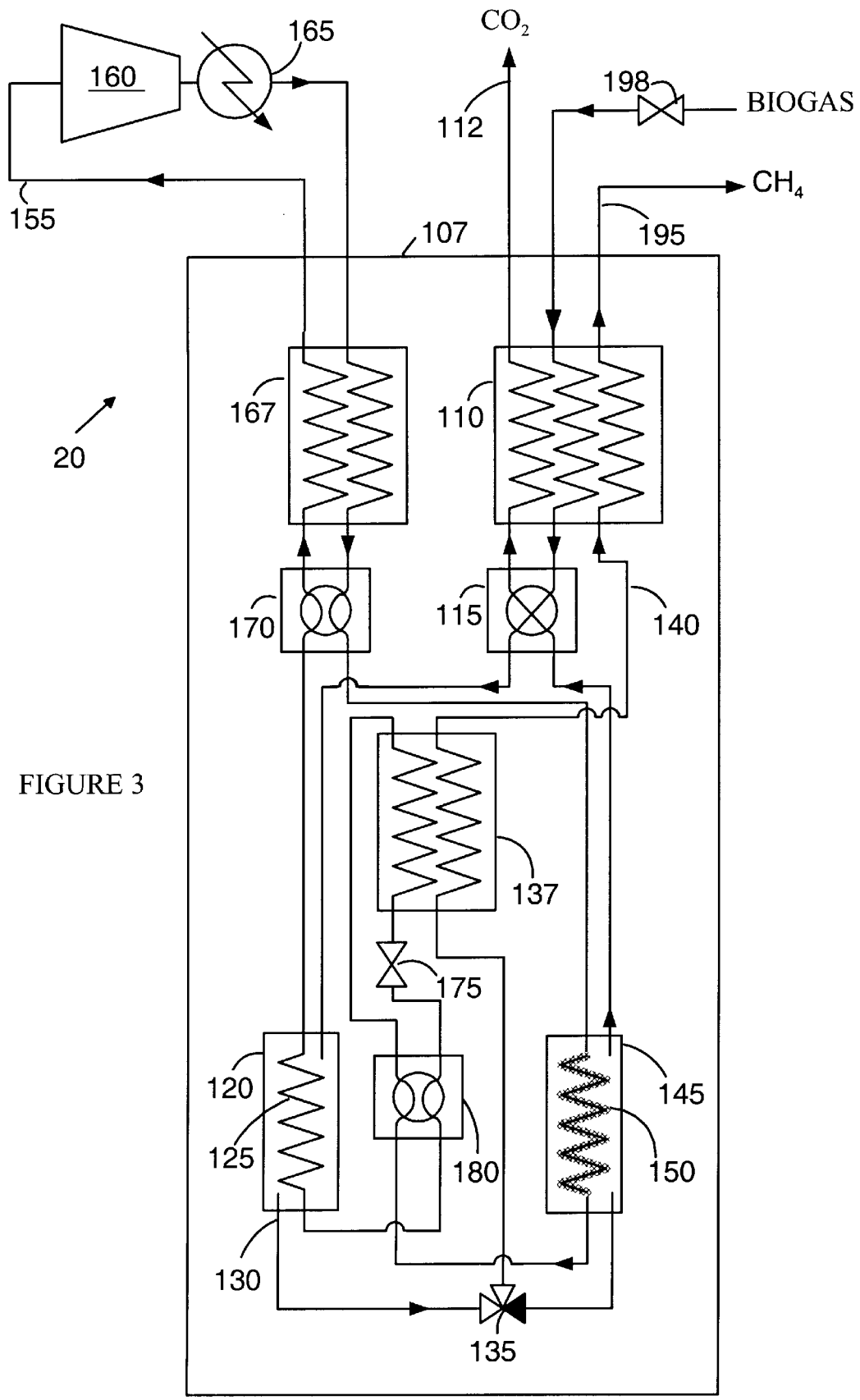
FIG. 3 is a schematic drawing of the present invention producing high purity pressurized methane gas at slightly sub-ambient temperatures.

To provide adequate separation of the $CO_2$, heat exchanger 20/120 in FIGS. 2 and 3 must be run at a pressure near 200 psig and with a coldest temperature below about 150° K. These conditions assure that the gas exiting heat exchanger 20/120 has no more than ~0.02% $CO_2$. Alternatively, it may be desirable to produce a methane gas product that has higher $CO_2$ levels. If the coldest temperature in the active heat exchanger is raised from about 150° K. the purified output methane stream will remain as a gas and have a correspondingly higher concentration of $CO_2$ upon leaving the active heat exchanger. The concentration of the $CO_2$ is directly controllable by adjusting the coldest temperature in the active heat exchanger. The adjustment of this temperature provides a means for controlling the quality of the output gas and provides the present invention with the ability to produce pipeline quality natural gas from biogas where the allowable concentration of $CO_2$ is usually less than 2 vol. %.

Although the preferred embodiment is intended for use with biogas, other gas streams containing carbon dioxide and methane can be similarly purified with the present invention. For example, the present invention may be utilized to purify wellhead gas containing large amounts of carbon dioxide.

Various modifications to the present invention will become apparent to those skilled in the art from the foregoing description and accompanying drawings. Accordingly, the present invention is to be limited solely by the scope of the following claims.

What is claimed is:

1. An apparatus for separating $CO_2$ from a mixture of gases comprising $CO_2$ and a second gas, said apparatus comprising:

an active heat exchanger for freezing said $CO_2$ in said mixture, said active heat exchanger comprising a heat exchange surface in contact with said mixture of gases, said mixture of gases being present at a predetermined pressure, said heat exchange surface being cooled by a refrigerant having a temperature below that at which $CO_2$ freezes at said predetermined pressure;

a regenerating heat exchanger for pre-cooling said refrigerant, said regenerating heat exchanger comprising a heat exchange surface in contact with said refrigerant and also in contact with a layer of frozen $CO_2$, said refrigerant entering said regenerating heat exchanger at a temperature above that at which said $CO_2$ in said frozen layer of $CO_2$ sublimates;

an expansion valve for expanding said refrigerant after said refrigerant has been precooled in said regenerating heat exchanger and prior to said refrigerant entering said active heat exchanger; and a compressor for compressing said refrigerant after said refrigerant has left said active heat exchanger, said compressor having an input port for receiving said refrigerant after said refrigerant has left said active heat exchanger and an output port for discharging said compressed refrigerant.

2. The apparatus of claim 1 wherein said apparatus comprises first and second heat exchangers, at any given time, one of said heat exchangers is said active heat exchanger and the other of said heat exchangers is said regenerating heat exchanger, said apparatus further comprising a valve system for selecting which of said first and second heat exchangers is said active heat exchanger.

3. The apparatus of claim 2 wherein each of said heat exchangers comprises:

a heat exchange coil having an input end for receiving refrigerant and an output end for discharging refrigerant, said heat exchange coil having an outer surface that is in thermal contact with refrigerant passing through said heat exchange coil; and a chamber for bringing a gas in contact with said outer surface of said heat exchange coil, said chamber having an input port and an output port for receiving and discharging a gas to be cooled by contact with said outer surface of said heat exchange coil, and wherein said valve system comprises a first valve system for connecting said output port of said compressor to said input end of said heat exchange coil in said regenerating heat exchanger and for connecting said output end of said heat exchange coil in said active heat exchanger to said input port of said compressor; and a second valve system for routing said mixture of gases to said input port of said active heat exchanger.

4. The apparatus of claim 1 further comprising an input gas precooling heat exchanger for precooling said mixture of gases by bringing said mixture of gases into thermal contact with $CO_2$ leaving said regenerating heat exchanger.

5. The apparatus of claim 1 further comprising a refrigerant precooling heat exchanger for cooling said compressed refrigerant by bringing said compressed refrigerant into thermal contact with said refrigerant leaving said active heat exchanger prior to said compressed refrigerant entering said regenerating heat exchanger.

* * * * *